United States Patent
Fukaya

(10) Patent No.: US 10,284,026 B2
(45) Date of Patent: May 7, 2019

(54) POWER SUPPLY DEVICE THAT SUPPLIES POWER TO POWER RECEIVING DEVICE IN CONTACTLESS MANNER, METHOD OF CONTROLLING POWER SUPPLY DEVICE, AND STORAGE MEDIUM

(71) Applicant: CANON KABUSHIKI KAISHA, Tokyo (JP)

(72) Inventor: Yudai Fukaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/133,250

(22) Filed: Sep. 17, 2018

(65) Prior Publication Data
US 2019/0097470 A1    Mar. 28, 2019

(30) Foreign Application Priority Data
Sep. 25, 2017 (JP) .................. 2017-183512

(51) Int. Cl.
| | |
|---|---|
| H04B 5/00 | (2006.01) |
| H02J 50/80 | (2016.01) |
| H02J 50/90 | (2016.01) |
| H02J 50/10 | (2016.01) |
| H04W 4/80 | (2018.01) |

(Continued)

(52) U.S. Cl.
CPC .............. *H02J 50/80* (2016.02); *H02J 50/10* (2016.02); *H02J 50/40* (2016.02); *H02J 50/90* (2016.02); *H04W 4/80* (2018.02); *G06F 1/26* (2013.01)

(58) Field of Classification Search
None
See application file for complete search history.

(56) References Cited

U.S. PATENT DOCUMENTS

| | | | | |
|---|---|---|---|---|
| 8,107,881 B2 * | 1/2012 | Dewan | ................ | G06Q 20/202 455/41.2 |
| 8,280,306 B2 * | 10/2012 | Oba | ................... | H04L 63/0492 455/41.2 |

(Continued)

FOREIGN PATENT DOCUMENTS

JP      2014-131108 A      7/2014

*Primary Examiner* — Tuan A Tran
(74) *Attorney, Agent, or Firm* — Canon U.S.A. Inc. IP Division

(57) ABSTRACT

A power supply device includes a first communication antenna, a second communication antenna, a power supply antenna for power supply to a power receiving device, a communication control unit to control sharing processing via the first communication antenna and establishment processing of establishing the communication via the second communication antenna with the power receiving device with information shared by the sharing processing, a power supply control unit to control authentication processing for the power supply to the power receiving device and power supply processing of performing the power supply to the power receiving device authenticated by the authentication processing, and a control unit configured to control the sharing processing and the authentication processing to be performed alternately, wherein, in a case where the power supply processing starts before completion of the establishment processing, the power supply stops and the sharing processing is performed again.

11 Claims, 5 Drawing Sheets

(51) Int. Cl.
*H02J 50/40* (2016.01)
*G06F 1/26* (2006.01)

(56) References Cited

U.S. PATENT DOCUMENTS

| | | | | |
|---|---|---|---|---|
| 8,290,436 | B2* | 10/2012 | Forrest | H04B 5/02 |
| | | | | 340/12.25 |
| 8,406,253 | B2* | 3/2013 | Kato | H04L 63/0492 |
| | | | | 370/328 |
| 8,447,233 | B2* | 5/2013 | Hirsch | H04L 63/18 |
| | | | | 455/41.1 |
| 8,749,823 | B2* | 6/2014 | Kato | G06F 3/1222 |
| | | | | 358/1.14 |
| 8,798,542 | B2* | 8/2014 | Oba | H04L 63/0492 |
| | | | | 455/41.2 |
| 8,944,922 | B2* | 2/2015 | Westerberg | H04M 1/72544 |
| | | | | 463/40 |
| 9,455,768 | B2* | 9/2016 | Griffin | H04B 5/0031 |
| 9,748,774 | B2* | 8/2017 | Van Den Brink | H02J 5/005 |
| 9,749,953 | B2* | 8/2017 | Seo | H04W 4/80 |
| 9,751,497 | B2* | 9/2017 | Sanji | B60R 25/24 |
| 10,165,440 | B2* | 12/2018 | Smith | H04W 12/06 |
| 2014/0370804 | A1* | 12/2014 | Dorning | H04B 5/0031 |
| | | | | 455/41.1 |

* cited by examiner

US 10,284,026 B2

POWER SUPPLY DEVICE THAT SUPPLIES POWER TO POWER RECEIVING DEVICE IN CONTACTLESS MANNER, METHOD OF CONTROLLING POWER SUPPLY DEVICE, AND STORAGE MEDIUM

BACKGROUND

Field

The present disclosure relates to a power supply device that supplies power to a power receiving device in a contactless manner.

Description of the Related Art

In recent years, there has been known a power supply system including a power supply device that outputs power in a contactless manner without connection with a connector and a power receiving device that charges a secondary battery with the power output from the power supply device. The power supply system forms a power supply path when the devices come within a predetermined distance to each other.

There has been known a technique of facilitating establishment of higher-speed communication in contactless close proximity wireless communication that forms a communication path in a similar manner that devices come close to each other (Japanese Patent Laid-Open No. 2014-131108).

Based on an idea that the proximity between devices enables for processing for power supply and close proximity wireless communication, from the conventional techniques described above, consideration is made in that higher-speed wireless communication is performed with power supply received. In this case, the power in power supply has influence on the close proximity wireless communication, and thus it is likely that correct communication cannot be performed. As a result, it may be difficult to establish the higher-speed wireless communication.

SUMMARY

A power supply device configured to supply power to a power receiving device in a contactless manner includes a first communication antenna for communication with the power receiving device, a second communication antenna for communication with the power receiving device, a power supply antenna for power supply to the power receiving device, a communication control unit configured to control sharing processing of sharing a communication parameter with the power receiving device via the first communication antenna and establishment processing of establishing the communication via the second communication antenna with the power receiving device with information shared by the sharing processing, a power supply control unit configured to control authentication processing for the power supply to the power receiving device via the power supply antenna and power supply processing of performing the power supply via the power supply antenna to the power receiving device authenticated by the authentication processing; and a control unit configured to control the sharing processing and the authentication processing to be performed alternately, wherein, in a case where the power supply processing starts before completion of the establishment processing of establishing the communication via the second communication antenna, the power supply stops and the sharing processing is performed again.

Further features will become apparent from the following description of exemplary embodiments with reference to the attached drawings.

DESCRIPTION OF THE EMBODIMENTS

Exemplary embodiments will be described in detail below with reference to the drawings.

<System Configuration>

Figure 1:
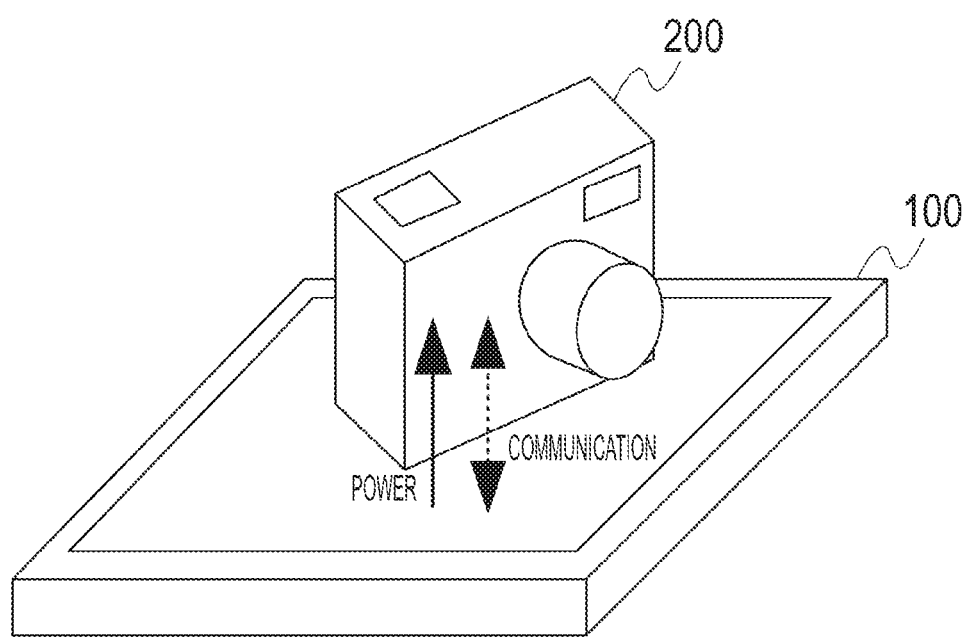
FIG. 1 is a view of a system according to the present embodiment.

A first embodiment will be described in detail below with reference to the drawings. A power supply system according to the first embodiment includes a power supply device 100 and a power receiving device 200, as illustrated in FIG. 1. In the contactless power supply system according to the first embodiment, in a case where the distance between the power supply device 100 and the power receiving device 200 is within a predetermined range, the power supply device 100 performs power supply to the power receiving device 200 in a contactless manner through a power supply antenna 104. Based on information superimposed on the power output through the power supply antenna 104, the power supply device 100 authenticates whether the power receiving device 200 is a contactless power-supply compliant device.

The power receiving device 200 charges a secondary battery 208 attached to the power receiving device 200 with the power received from the power supply device 100 through a power receiving antenna 204.

In a case where the distance between the power supply device 100 and the power receiving device 200 is within the predetermined range, the power supply device 100 performs first communication processing with the power receiving device 200 through a first communication antenna 106. Then, the power supply device 100 performs second communication with the power receiving device 200 through a second communication antenna 107.

In a case where the distance between the power supply device 100 and the power receiving device 200 exceeds the predetermined range, the power supply device 100 cannot perform the power supply to the power receiving device 200. Note that the predetermined range enables the authentication to be performed between the power supply device 100 and the power receiving device 200.

<Block Diagram>

Figure 2:
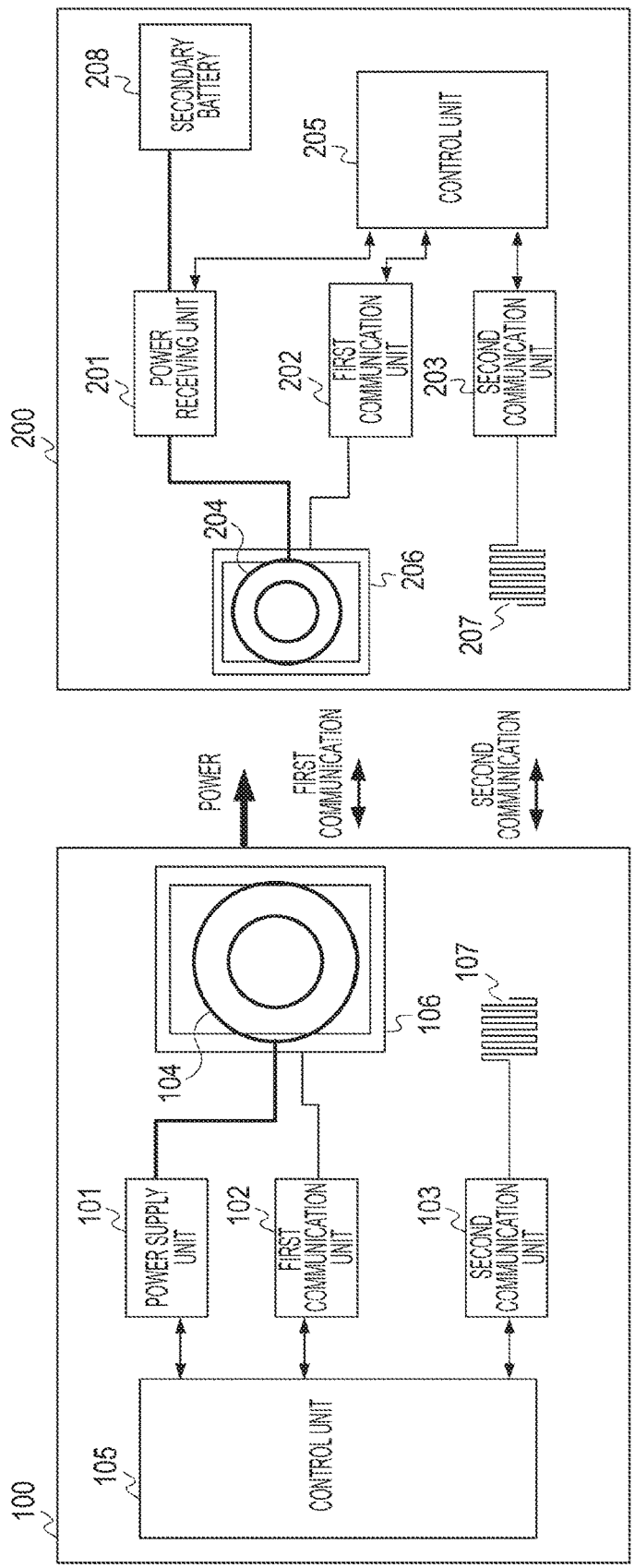
FIG. 2 is a block diagram of a contactless power supply system according to the present embodiment.

FIG. 2 is a block diagram of the contactless power supply system including the power supply device 100 and the power receiving device 200.

First, the power supply device 100 will be described.

As illustrated in FIG. 2, the power supply device 100 includes a power supply unit 101, a first communication unit 102, a second communication unit 103, the power supply antenna 104, a control unit 105, the first communication antenna 106, and the second communication antenna 107.

The power supply unit 101 transmits the power with a predetermined frequency for output in the contactless manner to the power supply antenna 104. The power supply unit 101 includes an oscillator, a power amplifier, and a voltage adjusting circuit, and inputs an alternate current signal from the oscillator into the power amplifier supplied with a voltage adjusted by the voltage adjusting circuit to amplify the signal as power to be output. The predetermined frequency can be a variable value or a fixed value.

The power supply unit 101 can include an impedance converting circuit that adjusts output impedance, or can change the frequency or phase of the power to be output. The power supply unit 101 also receives the information superimposed on the output power by the power receiving device 200 to determine whether the power receiving device 200 is a device compliant with the power supply scheme of the power supply unit 101. The power supply unit 101 can superimpose information on the power to be output to transmit the information to the power receiving device 200. The power to be output from the power supply unit 101 includes at least first power with which the authentication is performed to the power receiving device 200, and second power larger than the first power, with which state information is received from the power receiving device 200. The first power to be output from the power supply unit 101 is sufficient for the operation of the power receiving device 200. The power supply unit 101 also performs simplified communication with the control unit 105.

For example, the simplified communication enables information indicating 0 or 1 to be transmitted between the power supply unit 101 and the control unit 105 connected through a dedicated control line. When receiving a power-supply start request signal from the control unit 105, the power supply unit 101 outputs the power for power supply. The power output by the power supply unit 101 first includes the first power, and then autonomously switches to the second power in a case where it is determined, after the authentication of the power receiving device 200, that the power receiving device 200 is a device compliant with the power supply scheme of the power supply device 100. When it is determined, after the authentication, that the power receiving device 200 is a device compliant with the power supply scheme of the power supply device 100, the power supply unit 101 transmits a signal indicating that the power supply is being performed to the control unit 105 and switches the power being output to the second power. In a case where information received from the power receiving device 200 indicates that power receiving is to be finished, the power supply unit 101 transmits a power-supply finish request signal to the control unit 105. The communication between the power supply unit 101 and the control unit 105 can include serial communication in which multibit transmission or reception is performed. An example of the power supply scheme of the power supply unit 101 is the "Qi®" standard prescribed by wireless power consortium (WPC). In Qi®, the power to be output is modulated in frequency to have information and then is used for power supply control.

The first communication unit 102 transmits information from the control unit 105 to the first communication antenna 106 in a modulation scheme corresponding to a predetermined communication scheme to perform communication control of controlling the communication with the external power receiving device 200. The first communication unit 102 demodulates a signal received through the first communication antenna 106 in a demodulation scheme corresponding to the predetermined communication scheme to transmit the signal to the control unit 105. The first communication unit 102 converts information received from the control unit 105 into information supporting a protocol corresponding to the predetermined communication scheme to transmit the information to the first communication antenna 106. The first communication unit 102 changes information supporting the predetermined protocol received from the power receiving device 200 to information necessary for the control unit 105 to transmit the information to the control unit 105. The first communication unit 102 includes an impedance converting circuit for impedance matching with the first communication antenna 106.

The predetermined communication scheme of the first communication unit 102 includes a short-range communication scheme, such as near field communication (NFC). The first communication unit 102 communicates with an electronic device compliant with the same communication scheme, in addition to the power receiving device 200.

The second communication unit 103 transmits information from the control unit 105 in a modulation scheme corresponding to a predetermined communication scheme to the second communication antenna 107 to perform communication control of controlling the communication with the external power receiving device 200. The second communication unit 103 demodulates a signal received through the second communication antenna 107 in a demodulation scheme corresponding to the predetermined communication scheme to transmit the signal to the control unit 105. The second communication unit 103 converts information received from the control unit 105 into information supporting a protocol corresponding to the predetermined communication scheme to transmit the information to the second communication antenna 107. The second communication unit 103 changes information supporting the predetermined protocol received from the power receiving device 200 to information necessary for the control unit 105 to transmit the information to the control unit 105. The second communication unit 103 includes an impedance converting circuit for impedance matching with the second communication antenna 107.

The predetermined communication scheme of the second communication unit 103 includes a long range communication scheme, such as a wireless local area network (LAN) standard or a Bluetooth® standard. The second communication unit 103 communicates with an electronic device compliant with the same communication scheme, in addition to the power receiving device 200. In the present embodiment, a case where the second communication unit 103 uses a wireless LAN, will be described. In the present embodiment, in a case where the second communication unit 103 operates, a beacon is sent to form a wireless network. The power receiving device 200 accesses the wireless network to communicate with the power supply device 100.

The long range communication to be performed by the second communication unit 103 is distant in wavelength. That is, because the communication to be performed by the second communication unit 103 (for example, 2.4 GHz) is sufficiently shorter in wavelength than the communication to be performed by the first communication unit 102 (for example, 13.56 MHz), the communication with the same power receiving device 200 is referred to as long range communication.

The power supply antenna 104 includes a loop-shaped coil, and generates a magnetic field for supplying the power receiving device 200 with the power generated by the power supply unit 101 in the contactless manner.

The control unit 105 includes a CPU and a memory that control digital data, and is connected to the power supply unit 101, the first communication unit 102, and the second communication unit 103 to control each unit. The control unit 105 transmits an operation request signal to the power supply unit 101. When receiving the operation request signal from the control unit 105, the power supply unit 101 autonomously outputs the first power to perform the authentication. When the authentication finishes, the power supply unit 101 outputs the second power to control the second power based on a signal received from the power receiving device 200. When switching the power being output to the second power, the power supply unit 101 transmits the signal indicating that the power supply is being performed, to the control unit 105. The control unit 105 identifies that the power receiving device 200 is located within the predetermined range, based on the signal indicating that the power supply is being performed/received from the power supply unit 101.

The first communication antenna 106 includes a loop-shaped antenna, and is disposed near the power supply antenna 104. The first communication antenna 106 generates a magnetic field for communication with a short-range external electronic device from power for communication from the first communication unit 102.

The second communication antenna 107 includes a meander line antenna, and generates an electromagnetic wave from power for communication from the second communication unit 103 to communicate with the power receiving device 200.

The power supply device 100 has been described above.

Next, the power receiving device 200 will be described. As illustrated in FIG. 2, the power receiving device 200 includes a power receiving unit 201, a first communication unit 202, a second communication unit 203, the power receiving antenna 204, a control unit 205, a first communication antenna 206, a second communication antenna 207, and the secondary battery 208.

Based on the power received from the power supply device 100 through the power receiving antenna 204, the power receiving unit 201 supplies the secondary battery 208 with the power to charge the secondary battery 208. The power receiving unit 201 includes a rectifying smoothing circuit and a charging control circuit, and converts the alternate current power received through the power receiving antenna 204 into direct current power with the rectifying smoothing circuit to control the direct current power for a charging current and a charging voltage meeting the remaining capacity of the secondary battery 208. The power receiving unit 201 can include an impedance converting circuit that adjusts input impedance. The power receiving unit 201 superimposes information onto the received power to transmit the information to the power supply device 100. The information to be transmitted to the power supply device 100 indicates that the secondary battery 208 has been fully charged or the power receiving device 200 is compliant with the power supply scheme of the power supply device 100.

The first communication unit 202 transmits information from the control unit 205 in a modulation scheme corresponding to the predetermined communication scheme to the first communication antenna 206 to communicate with the external power supply device 100. The first communication unit 202 demodulates a signal received via the first communication antenna 206 in a demodulation scheme corresponding to the predetermined communication scheme to transmit the signal to the control unit 205. The first communication unit 202 converts information received from the control unit 205 into the information supporting the protocol corresponding to the predetermined communication scheme to transmit the information to the first communication antenna 206. The first communication unit 202 changes the information supporting the predetermined protocol received from the power supply device 100 to information necessary for the control unit 205, to transmit the information to the control unit 205. The first communication unit 202 includes an impedance converting circuit for impedance matching with the first communication antenna 206.

The second communication unit 203 transmits information from the control unit 205 in a modulation scheme corresponding to the predetermined communication scheme to the second communication antenna 207 to communicate with the external power supply device 100. The second communication unit 203 demodulates a signal received via the second communication antenna 207 in a demodulation scheme corresponding to the predetermined communication scheme to transmit the signal to the control unit 205. The second communication unit 203 converts information received from the control unit 205 into the information supporting the protocol corresponding to the predetermined communication scheme to transmit the information to the second communication antenna 207. The second communication unit 203 converts the information supporting the predetermined protocol received from the power supply device 100 into information necessary for the control unit 205 to transmit the information to the control unit 205. The second communication unit 203 includes an impedance converting circuit for impedance matching with the second communication antenna 207.

The power receiving antenna 204 includes a loop-shaped coil, and receives the alternate current magnetic field from the power supply device 100 as the alternate current power.

The control unit 205 includes a CPU and a memory that control digital data, and is connected to the power receiving unit 201, the first communication unit 202, and the second communication unit 203 to control each unit. The CPU of the control unit 205 includes two CPUs, a CPU with large power consumption that performs high-speed processing, and a CPU with low power consumption that operates at low speed. The CPU that performs high-speed processing mainly operates to perform the second communication processing in communication with the second communication unit 203.

The low-speed CPU mainly performs the first communication processing and power receiving operation in communication with the power receiving unit 201 and the first communication unit 202.

The first communication antenna 206 includes a loop-shaped antenna, and is disposed near the power receiving antenna 204. The first communication antenna 206 receives the magnetic field with the information superimposed output from the power supply device 100.

The second communication antenna 207 including a meander line antenna receives the electromagnetic wave output from the power supply device 100.

In the present embodiment, the power supply device 100 transmits the power to the power receiving device 200 in the contactless manner, and the power receiving device 200 receives the power from the power supply device 100 in the contactless manner. "Contactless" can be also referred to as "wireless" or "noncontact".

<Operation of Power Supply Device 100>

Figure 3:
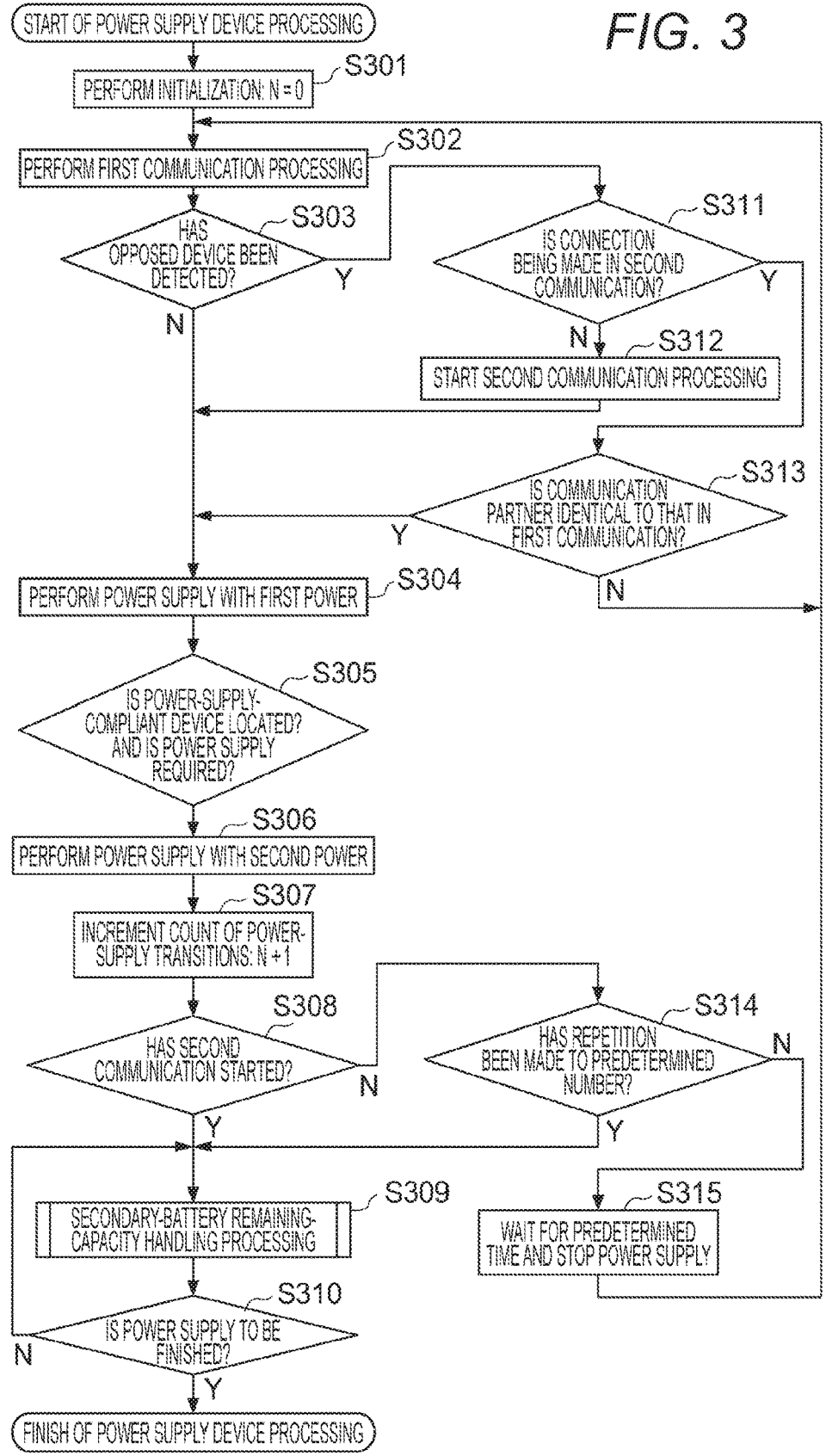
FIG. 3 is a processing flow of a power supply device according to the present embodiment.

FIG. 3 is a flowchart of the operation of the power supply device 100 according to the present embodiment.

At S301, the control unit 105 first initializes a stored control value. Specifically, the control unit 105 controls the power supply unit 101 to set, at zero, the count of the number of transitions to power supply.

At S302, the control unit 105 controls the first communication unit 102 to transmit via the first communication antenna 106 a polling signal for verifying whether an opposed device (i.e., the power receiving device 200) is located within the predetermined range. In a case where it is verified that the power receiving device 200 is located within the predetermined range, the control unit 105 performs the first communication processing to transmit a request signal for transmission of information indicating whether the power receiving device 200 is compliant with the second communication processing. When determining that the power receiving device 200 is compliant with the second communication processing, the power supply device 100 transmits a communication parameter as unique information regarding the second communication of the power supply device 100 to the power receiving device 200. This arrangement enables the unique information regarding the second communication to be shared between the power supply device 100 and the power receiving device 200. The processing at the present step is an exemplary sharing processing. The unique information regarding the second communication includes a service set identifier (SSID) and a password to be used for the wireless LAN.

At S303, the control unit 105 verifies whether a response signal has been received from the other device via the first communication antenna 106 and the first communication unit 102. In a case where the response signal has been received, the power receiving device 200 is considered to be within the communication range, and then the processing proceeds to S311. In a case where the response signal has not been received, the power receiving device 200 accessible in communication is considered not to be within the communication range, and the processing proceeds to S304.

At S304, the control unit 105 transmits the operation request signal to the power supply unit 101, and then the power supply unit 101 outputs the first power for authentication into the predetermined range via the power supply antenna 104.

At S305, the control unit 105 continues transmitting the operation request signal to the power supply unit 101 to perform authentication processing. Specifically, the power supply unit 101 determines whether the power receiving device 200 compliant with the power supply scheme of the power supply device 100 is located within the predetermined range based on the signal received via the power supply antenna 104. When receiving, from the power receiving device 200, the signal indicating that the power receiving device 200 is compliant with the power supply scheme of the power supply device 100, the power supply unit 101 determines that the power receiving device 200 is located within the predetermined range. The authentication processing is then completed. The power receiving device 200 is determined to be supplied with the power, and additionally the signal indicating that the power supply is being performed is transmitted to the control unit 105. Then, the processing proceeds to S306. In a case where the control unit 105 has not received the signal indicating that the power supply is being performed from the power supply unit 101 over a certain period, the control unit 105 determined that the power receiving device 200 compliant with the power supply scheme of the power supply device 100 is not located within the predetermined range. Then, the processing returns to S302. In this case, the control unit 105 stops transmitting the operation request signal to the power supply unit 101.

At S306, the control unit 105 continues transmitting the operation request signal to the power supply unit 101 because the control unit 105 has received the signal, from the power supply unit 101 at S305, indicating that the power receiving device 200 is located. After the completion of the authentication processing, the power supply unit 101 autonomously switches the power being output to the second power. This arrangement starts power supply processing. The power supply processing is performed in parallel to the processing at and after S308 until the power supply processing stops at S315.

At S307, the control unit 105 increments and stores the number of transitions into second information indicating the number of transitions to power supply because the control unit 105 has received, from the power supply unit 101, the signal indicating that the power supply is being performed.

At S308, when the control unit 105 determines that the second communication has started from first information indicating that the second communication has started, the processing proceeds to S309. Otherwise, the processing proceeds to S314. The first information indicating whether the second communication processing has started is stored at S312 after the performance of the first communication processing at S302.

At S309, the control unit 105 performs secondary-battery remaining-capacity handling processing. The secondary-battery remaining-capacity handling processing is intended for handling a case where the remaining capacity of the secondary battery 208 decreases to a predetermined value due to the performance of the second communication processing while the power receiving device 200 is receiving the power. The details thereof are described below with reference to FIG. 4.

At S310, when receiving a signal indicating that the power receiving has finished from the power receiving device 200, the power supply unit 101 transmits the power-supply finish request signal to the control unit 105. When receiving the power-supply finish request signal from the power supply unit 101, the control unit 105 stops transmitting the operation request signal to the power supply unit 101 and finishes the power supply to finish the present processing of the power supply device 100. The power receiving device 200 transmits the signal indicating that the power receiving has finished in a case where the secondary battery 208 has been fully charged or an abnormality has been detected in a charging operation.

At S311, the control unit 105 determines whether the power supply device 100 is already in communication through the second communication unit 103. In a case where it is determined that the power supply device 100 is out of communication, the processing proceeds to S312. In a case where it is determined that the power supply device 100 is in communication, the processing proceeds to S313.

At S312, the control unit 105 performs establishment processing for establishing the second communication. For example, the establishment processing includes security authentication processing for starting communication compliant with a wireless LAN communication standard. The communication link between the power supply device 100 and the power receiving device 200 is established with the SSID used at S302. For example, information to be used in the second communication processing, includes image information with a large information amount. The power supply device 100 receives the information from the power receiving device 200. The control unit 105 of the power supply device 100 requests the power receiving device 200 to transmit the image information as the second communication processing. Note that the wireless LAN communication that has started at S312 continues operating in parallel to the processing at and after S312. After that, the processing proceeds to S304.

At S313, the control unit 105 verifies whether the communication partner in the second communication processing is identical to that in the first communication processing. The verification is performed such that the power supply device 100 receives the unique ID information regarding the power receiving device 200 at S303 and similarly receives the unique ID information regarding the power receiving device 200 in the second communication. In a case where the power supply device 100 is already in communication with the identical partner, the processing proceeds to S304 without performance of the processing at S312 anew. In a case where the partner in the communication is not identical to that in the first communication, the processing returns to S302.

At S314, the control unit 105 determines whether the number of transitions to power supply that is the second information at S307 has reached a predetermined number. In a case where the control unit 105 determines the second information has reached the predetermined number, the processing proceeds to S309 for the secondary-battery remaining-capacity handling processing. When the control unit 105 determines the second information has not reached the predetermined number, the processing proceeds to S315. The counting of the number of transitions to power supply at S307 is intended for handling a case where the second communication cannot be performed because the remaining capacity of the secondary battery 208 of the power receiving device 200 is empty. The power receiving device 200 is supplied with the second power from the power supply device 100 at S306, but a one-time power supply is not necessarily sufficient power for the power receiving device 200 to perform the second communication processing. Thus, the power supply is repeated several times (for example, five times), so that the power receiving device 200 can acquire sufficient power. The counting of the number of transitions to power supply at S307 is also intended for handling a case where the power receiving device 200 includes a device not compliant with the first communication processing or the second communication processing. When the control unit 105 determines at S314 that the repetition of power supply has been made to the predetermined number, the processing does not return to S302. Thus, a time during which no power supply is being performed is avoided so that a time necessary for the secondary battery 208 of the power receiving device 200 to be fully charged can be reduced.

At S315, the control unit 105 waits for a predetermined time until a certain amount of power is supplied to the power receiving device 200, and then stops transmitting the operation request signal to the power supply unit 101. The processing returns to S302 and then the first communication processing is re-performed. After that, the processing at S302 to S314 is repeated. That is, the first communication processing at S302 and the authentication processing at S304 are alternately repeated.

As described above, the power supply device 100 according to the first embodiment stores, at S312, the information indicating whether the second communication processing has started. This arrangement enables the processing to return to the first communication processing at S302 in a case where the second communication processing has not started, without enabling only the power supply operation to continue even when the authentication for power supply has correctly finished at S305. Thus, the second communication processing is enabled with the power supply retained.

<Control Flow of Secondary-Battery Remaining-Capacity Handling Processing>

Figure 4:
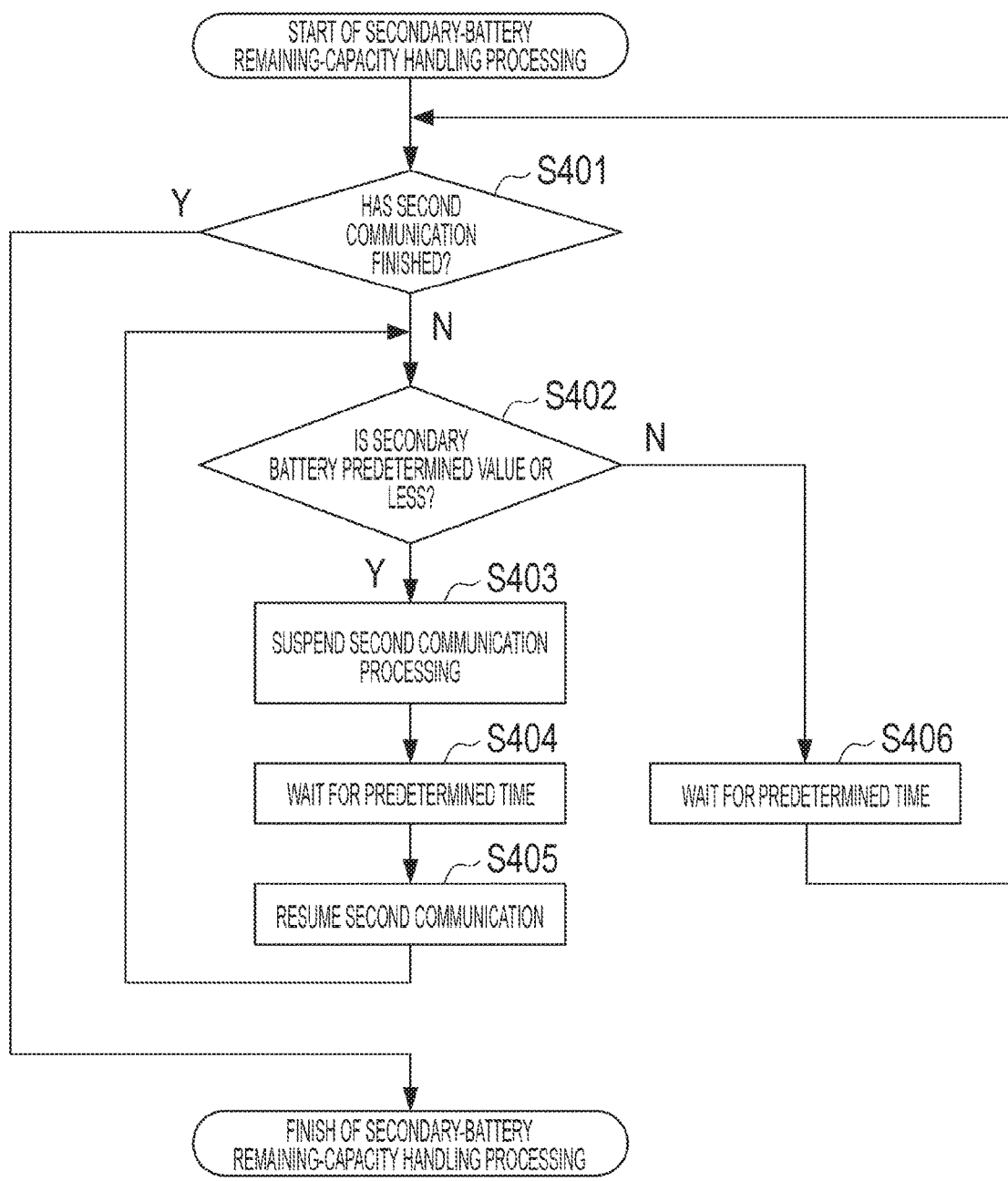
FIG. 4 is a flowchart of secondary-battery remaining-capacity handling processing according to the present embodiment.

The flow of the secondary-battery remaining-capacity handling processing at S309 of FIG. 3 will be described with reference to FIG. 4.

The flow of the secondary-battery remaining-capacity handling processing is intended for handling a case where the remaining capacity of the secondary battery 208 decreases to the predetermined value due to the performance of the second communication processing while the power receiving device 200 is receiving the power. That is, for example, a case where the power supply efficiency is low and the power receiving device 200 cannot receive sufficient power because the power receiving device 200 is within the predetermined range from the power supply device 100 but is located in the vicinity on the boundary of the range. In a power supply system in which the positional relationship in which the power supply efficiency is always favorable is acquired in power supply because of the physical shapes of the power supply device 100 and the power receiving device 200, the control unit 105 can skip the present processing to proceed to S310.

At S401, the control unit 105 determines whether the second communication processing started at S311 has finished. When determining that the second communication has finished, the control unit 105 finishes the present secondary-battery remaining-capacity handling processing in order to perform only the power supply. When the control unit 105 determines that the second communication has not finished, the processing proceeds to S402.

At S402, the control unit 105 communicates with the power receiving device 200 in the second communication to determine whether the remaining capacity of the secondary battery 208 of the power receiving device 200 is the predetermined value or less. In a case where the remaining capacity of the secondary battery 208 of the power receiving device 200 is the predetermined value or less, the processing proceeds to S403 in order to suspend the second communication processing. Otherwise, the processing proceeds to S406.

Because of the determination at S402 that the remaining capacity of the secondary battery 208 is the predetermined value or less, the control unit 105 suspends, at S403, the second communication processing to enable the power receiving device 200 to efficiently charge the secondary battery 208 with the received power.

At S404, the control unit 105 waits for a predetermined time until the secondary battery 208 is sufficiently charged. The predetermined time can be a fixed time, such as 15 minutes, or a maximum time during which the link of the second communication processing can be retained.

At S405, the control unit 105 resumes the second communication processing after the predetermined time at S404, and the processing returns to S402.

At S406, the control unit 105 waits for a predetermined time because of the determination, at S402, that the remaining capacity of the secondary battery 208 is not the predetermined value or less, and then the processing returns to S401. The reason for the wait for the predetermined time is that the remaining capacity of the secondary battery 208 does not vary rapidly.

As described above, the present processing controls the second communication processing to prevent the secondary battery 208 from being empty, even in a case where the power receiving device 200 cannot receive sufficient power and the remaining capacity decreases while the power is being received.

In a power supply system in which the positional relationship in which the power supply efficiency is always favorable is acquired in power supply because of the physical shapes of the power supply device 100 and the power receiving device 200, the control unit 105 of the power supply device 100 can skip the present processing to proceed to S310.

<Operation of Power Receiving Device 200>

Figure 5:
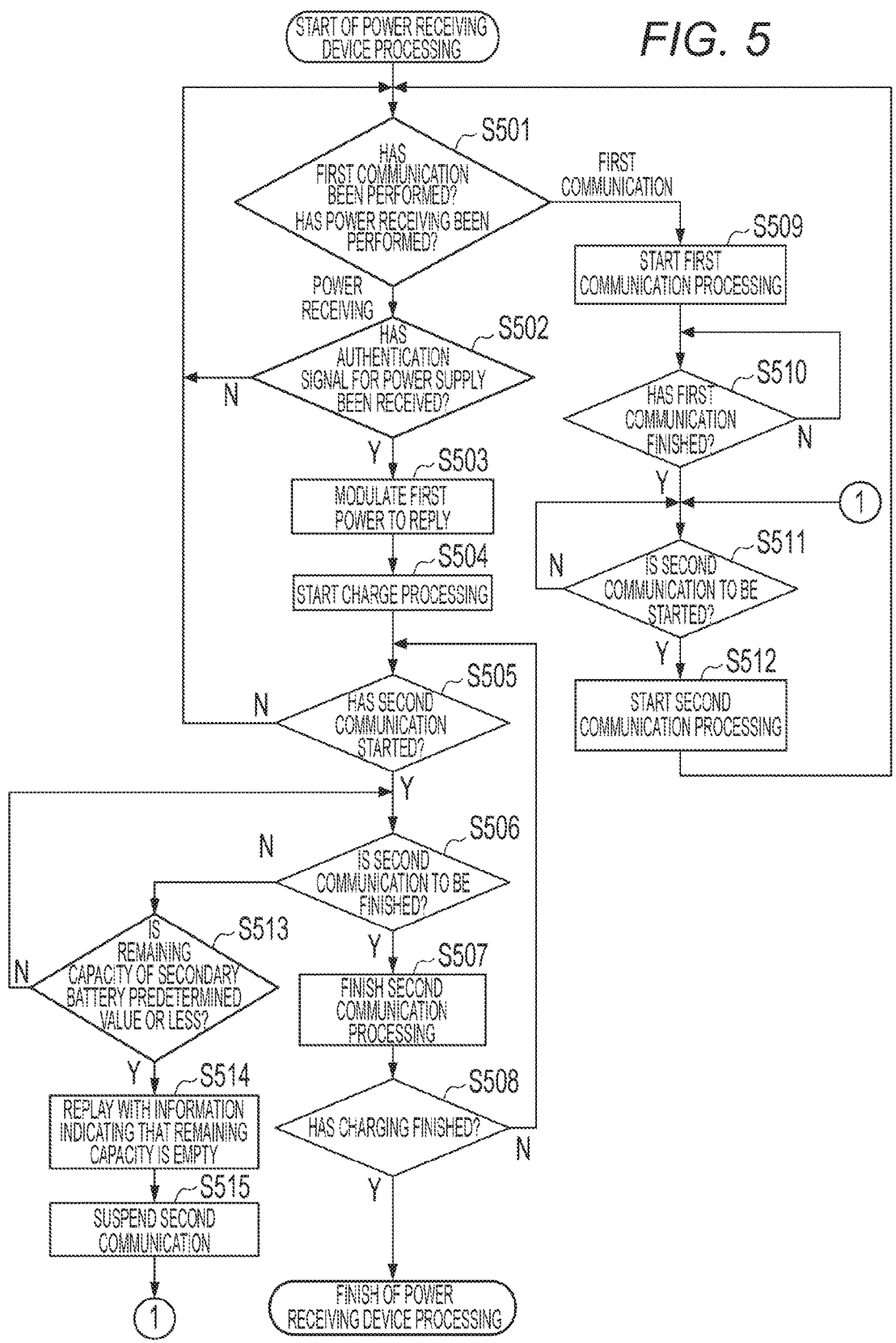
FIG. 5 is a processing flow of a power receiving device according to the present embodiment.

FIG. 5 is a flowchart of the operation of the power receiving device 200 according to the present embodiment.

At S501, the control unit 205 waits until the first communication unit 202 receives power for the first communication processing or the power receiving unit 201 receives the first power from the power supply device 100. When the power for the first communication is received, the processing proceeds to S509. When the first power is received, the processing proceeds to S502.

Because the power receiving device 200 is in low-power-consumption operation at S501, the control unit 205 of the power receiving device 200 can operate with the power output from the power supply device 100 even when the secondary battery 208 is empty.

At S502, it is determined whether the power receiving unit 201 has received an authentication request signal for power supply from the power supply device 100. In a case where the authentication request is received, the processing proceeds to S503. In a case where the power receiving unit 201 has not received the first power after a certain time with no receipt of the authentication request signal, a signal to be transmitted to the control unit 205 stops, and the control unit 205 returns the processing to S501.

Since the authentication signal from the power supply device 100 was received at S502, the power receiving unit 201 modulates, at S503, the first power from the power supply unit 101 to transmit a response signal to the power supply device 100. During this time, the power receiving unit 201 can transmit a signal indicating that a response has been made to the authentication to the control unit 205. In a case where the power receiving unit 201 does not transmit to the control unit 205 the signal indicating that a response has been made to the authentication, the control unit 205 enables the processing to proceed to S504 due to the elapse of the predetermined time.

At S504, the power receiving unit 201 receives the second power for power supply from the power supply device 100 to perform charge processing to the secondary battery 208. The power receiving unit 201 transmits a signal indicating that charging is being performed to the control unit 205.

At S505, the control unit 205 determines whether the second communication has started. In a case where the second communication has not started, the processing returns to S501. Separately from the control unit 205, the power receiving unit 201 continues charging the secondary battery 208 while the second power is being received from the power supply device 100. When the second communication processing has not started, the power supply device 100 stops the power supply at S315 and then the processing goes back to S302. Thus, the power receiving device 200 does not receive the power.

At S506, the control unit 205 determines whether second communication processing is to be finished. When the control unit 205 determines that the second communication processing is to be finished, the processing proceeds to S507 since the remaining capacity of the secondary battery 208 is not considered. When the control unit 205 determines that the second communication processing is not to be finished, the processing proceeds to S512 since the remaining capacity of the secondary battery 208 is considered.

At S507, the control unit 205 controls the second communication unit 203 to finish the second communication processing with the power supply device 100.

At S508, based on the signal from the power receiving unit 201 indicating that charging is being performed, the control unit 205 determines whether the charging has finished. When the charge processing finishes, the control unit 205 finishes the present processing of the power receiving device 200. Before the power receiving unit 201 stops the transmission of the signal indicating that charging is being performed and notifies the control unit 205 of the finish of the charging, the power receiving unit 201 transmits a signal indicating a power receiving finish to the power supply device 100. The notification of the power receiving finish is issued in a case where the secondary battery 208 is fully charged or a usual state occurs as a charging state.

At S509, the control unit 205 starts the first communication processing because the first communication unit 202 has received the power for the first communication processing at S501.

At 8510, the control unit 205 controls the first communication unit 202 to determine whether the first communication processing has finished. The unique information regarding the second communication is received from the power supply device 100 in the first communication processing.

At S511, the control unit 205 waits for receipt from the power supply device 100 of a start request signal for the second communication processing via the second communication unit 203. Upon receipt, the processing proceeds to S512.

At S512, the control unit 205 starts the second communication processing. In the second communication processing, information including a large information amount, such as the image information retained by the power receiving device 200, is transmitted to the power supply device 100. Thus, the power receiving device 200 power consumption is large (for example, 1 W) during the second communication processing.

Because of the determination at S506 that the second communication processing has not finished, the control unit 205 detects the remaining capacity of the secondary battery 208 at S513. In a case where the remaining capacity of the secondary battery 208 is the predetermined value (for example, one tenth of the fully charged state) or less, the processing proceeds to S514. When the control unit 205 determines that, the remaining capacity of the secondary battery 208 is not the predetermined value or less, the processing returns to S506.

Because of the determination at S513 that the remaining capacity of the secondary battery 208 is the predetermined value or less, the control unit 205 transmits, at S514, a signal indicating that the remaining capacity of the secondary battery 208 is empty to the power supply device 100 via the second communication unit 203.

Because the remaining capacity of the secondary battery 208 is the predetermined value or less and it is necessary to suppress the power consumption, the control unit 205 requests, at S515, the second communication unit 203 to suspend the second communication. Then, the processing returns to S511 to wait for resumption of the second communication processing.

As described above, the power receiving device 200 performs the operation processing as illustrated in FIG. 5 so that the power supply device 100 according to the first embodiment of the present disclosure can perform the second communication processing during the power supply.

The power supply device 100 according to the present disclosure is not limited to the power supply device 100 described in the present embodiment. The power receiving device 200 according to the present disclosure is not limited to the power receiving device 200 described in the present embodiment. For example, the power supply device 100 and the power receiving device 200 can be realized by a system including a plurality of devices.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-183512, filed Sep. 25, 2017, which is hereby incorporated by reference herein in its entirety.

What is claimed is:

1. A power supply device configured to supply power to a power receiving device in a contactless manner, the power supply device comprising:
a first communication antenna for communication with the power receiving device;
a second communication antenna for communication with the power receiving device;
a power supply antenna for power supply to the power receiving device;
a communication control unit configured to control sharing processing of sharing a communication parameter with the power receiving device via the first communication antenna and establishment processing of establishing the communication via the second communication antenna with the power receiving device with information shared by the sharing processing;
a power supply control unit configured to control authentication processing for the power supply to the power receiving device via the power supply antenna and power supply processing of performing the power supply via the power supply antenna to the power receiving device authenticated by the authentication processing; and
a control unit configured to control the sharing processing and the authentication processing to be performed alternately,
wherein, in a case where the power supply processing starts before completion of the establishment processing of establishing the communication via the second communication antenna, the power supply stops and the sharing processing is performed again.

2. The power supply device according to claim 1, wherein, in a case where the sharing processing is completed before completion of the authentication processing, the establishment processing and the authentication processing start simultaneously after the communication with the first communication antenna stops.

3. The power supply device according to claim 1, wherein output from the power supply antenna in the authentication processing is less than output from the power supply antenna in the power supply processing.

4. The power supply device according to claim 1, wherein, in the case where the power supply processing starts before the completion of the establishment processing of establishing the communication via the second communication antenna, the power supply stops after the power supply for a predetermined time and the sharing processing is performed again.

5. The power supply device according to claim 1, wherein, in a case where a number of times the sharing processing is performed reaches a predetermined number after the start of the power supply processing, the sharing processing is not performed again.

6. The power supply device according to claim 1, wherein the communication via the second communication antenna and the power supply processing are performed in parallel.

7. The power supply device according to claim 1, wherein, in a case where a remaining capacity of a secondary battery included in the power receiving device is a predetermined value or less during the communication via the second communication antenna, the communication via the second communication antenna stops for a predetermined time.

8. The power supply device according to claim 1, wherein the communication via the first communication antenna consumes less power than the communication via the second communication antenna.

9. The power supply device according to claim 1, wherein, in a case where the communication is performed with the power receiving device via the first communication antenna during the communication with the power receiving device via the second communication antenna, the authentication processing starts without performance of the establishment processing anew.

10. A method of controlling a power supply device including: a first communication antenna for communication with a power receiving device, a second communication antenna for communication with the power receiving device, and a power supply antenna for power supply to the power receiving device, the power supply device supplying power to the power receiving device in a contactless manner, the method comprising:

sharing a communication parameter with the power receiving device via the first communication antenna;

establishing the communication via the second communication antenna, with the power receiving device with information shared by the sharing;

processing authentication for the power supply to the power receiving device via the power supply antenna;

processing the power supply via the power supply antenna to the authenticated power receiving device; and controlling the sharing and the authentication processing to be performed alternately, wherein, in a case where the processing the power supply starts before completion of the establishing, the processing the power supply stops and the sharing is performed again.

11. A non-transitory computer-readable storage medium storing a program for causing a computer to execute a method of controlling a power supply device including a first communication antenna for communication with a power receiving device, a second communication antenna for communication with the power receiving device, and a power supply antenna for power supply to the power receiving device, the power supply device supplying power to the power receiving device in a contactless manner, the method comprising:

sharing a communication parameter with the power receiving device via the first communication antenna;

establishing the communication via the second communication antenna, with the power receiving device with information shared by the sharing;

processing authentication for the power supply to the power receiving device via the power supply antenna;

processing the power supply via the power supply antenna to the authenticated power receiving device; and controlling the sharing and the authentication processing to be performed alternately, wherein, in a case where the processing the power supply starts before completion of the establishing, the processing the power supply stops and the sharing is performed again.

* * * * *